United States Patent
Kawada

(10) Patent No.: US 9,143,660 B2
(45) Date of Patent: Sep. 22, 2015

(54) IMAGE PICKUP APPARATUS, LENS APPARATUS, AND IMAGE PICKUP SYSTEM OF A LENS INTERCHANGEABLE TYPE

(71) Applicant: CANON KABUSHIKI KAISHA, Tokyo (JP)

(72) Inventor: Kazutoshi Kawada, Utsunomiya (JP)

(73) Assignee: CANON KABUSHIKI KAISHA (JP)

( * ) Notice: Subject to any disclaimer, the term of this patent is extended or adjusted under 35 U.S.C. 154(b) by 0 days.

(21) Appl. No.: 13/894,524

(22) Filed: May 15, 2013

(65) Prior Publication Data

US 2013/0308042 A1 Nov. 21, 2013

(30) Foreign Application Priority Data

May 18, 2012 (JP) .................................. 2012-113894

(51) Int. Cl.
| | |
|---|---|
| H04N 5/225 | (2006.01) |
| G03B 13/00 | (2006.01) |
| H04N 5/232 | (2006.01) |
| G03B 13/22 | (2006.01) |
| G03B 17/14 | (2006.01) |

(52) U.S. Cl.
CPC ............. *H04N 5/225* (2013.01); *G03B 17/14* (2013.01); *H04N 5/23209* (2013.01); *G03B 2206/00* (2013.01)

(58) Field of Classification Search
CPC ... H04N 5/225; H04N 5/23209; G03B 17/14; G03B 2206/00
USPC ............ 348/207.99, 345, 357, 360, 373, 351, 348/352, 240.99, 240.3, 364; 396/89–152, 396/532, 79–83, 529, 125, 133; 359/696–704, 811–830
See application file for complete search history.

(56) References Cited

U.S. PATENT DOCUMENTS

| | | | |
|---|---|---|---|
| 8,326,139 B2* | 12/2012 | Shibuno et al. ............... | 396/121 |
| 8,717,451 B2 | 5/2014 | Okamoto et al. | |
| 2008/0007644 A1* | 1/2008 | Matsumoto ................... | 348/345 |
| 2008/0199169 A1* | 8/2008 | Yoshida ........................ | 396/95 |
| 2008/0199170 A1* | 8/2008 | Shibuno et al. ............... | 396/125 |

(Continued)

FOREIGN PATENT DOCUMENTS

| | | |
|---|---|---|
| WO | 2009/139173 A1 | 11/2009 |
| WO | 2009139118 A1 | 11/2009 |

OTHER PUBLICATIONS

Japanese Office Action issued in Japanese counterpart application No. JP2012-113894, dated Aug. 4, 2015.

*Primary Examiner* — Pritham Prabhakher

(74) *Attorney, Agent, or Firm* — Rossi, Kimms & McDowell LLP

(57) ABSTRACT

An image pickup system includes a lens apparatus, and an image pickup apparatus to which the lens apparatus is detachably attached. The image pickup apparatus controller changes a cycle of a control reference signal for internal processing of the image pickup apparatus, and sends a command of changing the cycle of the control reference signal to the lens controller in synchronization with a post-change control reference signal. The lens controller that has received the command changes the cycle of the control reference signal when the lens apparatus is ready to change the cycle of the control reference signal, and sends to the image pickup apparatus controller information representing whether the lens controller has been able to follow the change of the cycle of the control reference signal.

21 Claims, 8 Drawing Sheets

(56) References Cited

U.S. PATENT DOCUMENTS

| | | | |
|---|---|---|---|
| 2009/0262235 A1* | 10/2009 | Kawazoe et al. | 348/345 |
| 2010/0231782 A1* | 9/2010 | Okamoto et al. | 348/345 |
| 2011/0063472 A1* | 3/2011 | Kitahira et al. | 348/222.1 |
| 2011/0063497 A1* | 3/2011 | Kawazoe et al. | 348/373 |
| 2011/0064397 A1* | 3/2011 | Shibuno et al. | 396/133 |
| 2011/0317061 A1* | 12/2011 | Imafuji et al. | 348/357 |
| 2012/0076482 A1* | 3/2012 | Shibuno et al. | 396/125 |
| 2012/0081594 A1* | 4/2012 | Makigaki | 348/340 |
| 2012/0140110 A1* | 6/2012 | Makigaki | 348/345 |

\* cited by examiner

IMAGE PICKUP APPARATUS, LENS APPARATUS, AND IMAGE PICKUP SYSTEM OF A LENS INTERCHANGEABLE TYPE

BACKGROUND OF THE INVENTION

1. Field of the Invention

The present invention relates to an image pickup apparatus, such as a digital still camera and a digital video camera, a lens apparatus, and an image pickup system.

2. Description of the Related Art

A conventionally known lens interchangeable type camera system includes an image pickup apparatus (camera body) configured to provide image pickup processing, lens control, and image recording, and a lens apparatus configured to drive a lens and a diaphragm in accordance with a control command from the camera body. A smooth lens control is particularly required in capturing a motion image and in displaying the live view in synchronization with an image pickup cycle, and it is thus necessary to synchronize the image pickup timing of the camera body with the control timing of the lens apparatus. Hence, the lens apparatus controls driving of the image pickup optical system in synchronization with the control reference signal (synchronizing signal) provided from the camera body.

When the camera body changes the cycle of the control reference signal, it is necessary to avoid asynchronous state between the camera body and the lens apparatus. Accordingly, WO2009/139173 discloses a method of switching the cycle of the control reference signal by an advance notice of switching of the cycle from the camera body to the lens apparatus, by informing the camera body through the lens apparatus that the lens apparatus is ready to change the cycle, and by switching the cycle of the control reference signal in the camera body.

However, when the camera body sends an inquiry to the lens apparatus before switching the cycle of the control reference signal as in the method of WO2009/139173, switching takes a long time. Switching of the cycle of the control reference signal may be caused by an operation of an operator. In that case, the responsiveness and the operability may be sacrificed. In addition, the camera body needs to process the operation of the operator at the cycle of the current control reference signal until the cycle is switched, and when multiple processing tasks occur, communication processing delays and the cycle of the control reference signal cannot be maintained. Of course, when the camera body immediately changes the cycle of the control reference signal, the lens apparatus cannot follow the cycle and the malfunction may occur. For example, the lens apparatus smoothly moves a lens according to a moving speed calculated based upon a current position, a target position, and the cycle of the control reference signal in the motion image pickup. When the camera suddenly shortens the cycle of the control reference signal while the lens apparatus is moving the lens, the lens apparatus loses control of moving the lens to the target position within the shortened cycle.

SUMMARY OF THE INVENTION

The present invention provides an image pickup apparatus, a lens apparatus, and an image pickup system, in which a cycle of a control reference signal used for the image pickup system of a lens interchangeable type can be quickly switched without losing control.

An image pickup system according to the present invention includes a lens apparatus, and an image pickup apparatus to which the lens apparatus is detachably attached. The lens apparatus includes a lens controller, and an image pickup optical system configured to form an optical image of an object. The image pickup apparatus includes an image pickup apparatus controller configured to perform internal processing of the image pickup apparatus in synchronization with a control reference signal, and to communicate with the lens controller in synchronization with the control reference signal. The lens controller controls driving of the image pickup optical system in synchronization with the control reference signal provided from the image pickup apparatus controller. The image pickup apparatus controller changes a cycle of the control reference signal for the internal processing of the image pickup apparatus without inquiring the lens controller of whether the lens controller can follow a change of the cycle of the control reference signal, and sends a command of changing the cycle of the control reference signal to the lens controller in synchronization with a post-change control reference signal. The lens controller that has received the command changes the cycle of the control reference signal when the lens apparatus is ready to change the cycle of the control reference signal, and sends to the image pickup apparatus controller information representing whether the lens controller has been able to follow the change of the cycle of the control reference signal.

Further features of the present invention will become apparent from the following description of exemplary embodiments with reference to the attached drawings.

DESCRIPTION OF THE EMBODIMENTS

Figure 1:
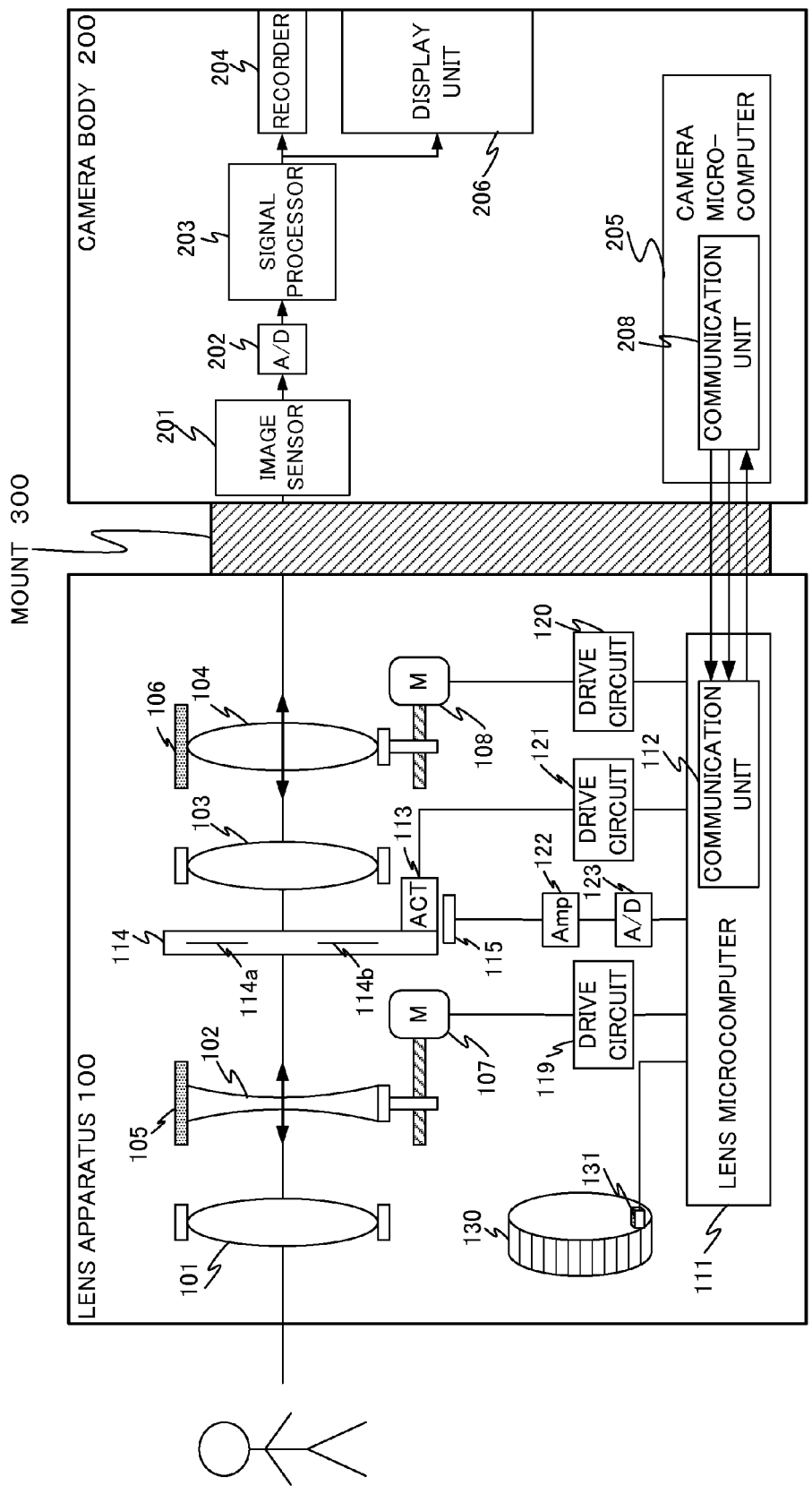
FIG. 1 is a block diagram of a lens interchangeable type camera system according to first and second embodiments of the present invention.

FIG. 1 is a block diagram of a lens interchangeable type camera system (image pickup system or optical apparatus) according to the present invention. The camera system includes a lens apparatus (interchangeable lens) 100 (optical apparatus), and a camera body 200 (image pickup apparatus or optical apparatus). The lens apparatus 100 is detachably attached to the camera body 200 via a mount 300.

The lens apparatus 100 includes an image pickup optical system. The image pickup optical system includes a plurality of optical lens units (optical elements), and forms an optical image of an object. The image pickup optical system of this embodiment includes, in order from the incident direction of the object image, a field lens 101, a zoom lens 102 as a magnification varying lens, a diaphragm unit 114 configured to adjust a light quantity, an afocal lens 103, and a focus lens 104. This lens configuration in which the focus lens 104 is arranged on the rear side from the object side is called a rear focus lens, and generally used for a small lens interchangeable type camera and a compact digital camera.

The zoom lens 102 configured to move in the optical axis direction and to change a focal length is held by a lens holding frame 105. The focus lens 104 configured to move in the optical axis direction for focusing is held by a lens holding frame 106. The lens holding frames 105 and 106 are movably configured in the optical axis direction by guide shafts (not illustrated). Stepping motors 107 and 108 are driven, and the lens holding frames 105 and 106 are driven in the optical axis direction (arrow directions in FIG. 1). The stepping motors 107 and 108 are motors configured to move the zoom lens 102 and the focus lens 104 in synchronization with driving pulses. The stepping motors 107 and 108 and driver circuits 119 and 120, which will be described later, constitute a lens driver configured to drive the zoom lens 102 and the focus lens 104.

A lens microcomputer 111 (lens controller) provides a variety of controls in accordance with commands sent from the camera body 200, which will be described later. The lens microcomputer 111 controls driving of the image pickup optical system in synchronization with a control reference signal provided from the camera microcomputer 205. The lens microcomputer 111 also provides controls in accordance with inputs from operational instructors such as a focus ring 130 provided around a barrel of the lens apparatus 100, and a zoom switch (not illustrated), and controls the entire operations of the lens apparatus 100. A detector 131 detects a rotating amount of the focus ring 130.

The stepping motor 107 is driven by the drive circuit 119, and the stepping motor 108 is driven by the drive circuit 120. The drivers 119 and 120 drive the stepping motors 107 and 108 in accordance with the driving signals input from the lens microcomputer 111. Zooming of the image pickup optical system and associative focusing are realized by controlling the stepping motors 107 and 108 utilizing an electronic cam system that employs cam locus data generally used for the digital camera. Thus, the lens microcomputer 111 controls the driver by providing a driving signal to the driver.

The diaphragm unit 114 configured to adjust a light quantity includes diaphragm blades 114a and 114b. The states of the diaphragm blades 114a and 114b are detected by a Hall element 115, and input into the lens microcomputer 111 via an amplifier 122 and an A/D converter 123. The lens microcomputer 111 outputs a control signal to the driver 121 based upon the input signal. A drive circuit 121 drives a diaphragm actuator 113 based upon the control signal.

The camera body 200 includes an image sensor 201, such as a CCD sensor and a CMOS sensor, configured to photoelectrically convert the optical image (object image) formed by the image pickup optical system, an A/D converter 202, a signal processor 203, a recorder 204, a camera microcomputer 205, and a display unit 206.

The optical image that passes the lens apparatus 100 is converted into an electric signal (analogue signal) through photoelectric conversions in the image sensor 201. The analogue signal is converted into a digital signal by the A/D converter 202, and input to the signal processor 203. The signal processor 203 provides various image processing to the input electric signal (digital signal), generates focus information representative of an in-focus state of an image and brightness signal information representative of an exposure state, and converts data into a recordable data format. Thereafter, an output signal (image signal) from the signal processor 203 is sent to the recorder 204, and the image signal is recorded in the recorder 204. In parallel, the object image generated by the signal processor 203 is displayed on the display unit 206, and a composition of a captured object image and a focusing state can be confirmed on the real-time basis. The display unit 206 can further display a menu screen that can be manipulated by a photographer. The camera microcomputer 205 (image pickup apparatus controller) controls the camera body in accordance with an input from an image pickup instructing switch (not illustrated), the menu screen, and a camera setting relating switch (not illustrated). At this time, the camera microcomputer 205 provides internal processing of the camera body 200 in synchronization with the control reference signal (synchronizing signal). In addition, the camera microcomputer 205 instructs the lens microcomputer 111 to drive the zoom lens 102, the diaphragm unit 114, and the focus lens 104, to set the focus ring 130 for control, and to provide an operation and a setting to the lens apparatus 100.

The lens apparatus 100 and the camera body 200 are mechanically and electrically connected to each other via a mount 300. They are communicatively connected to each other via a terminal unit of the mount 300. The lens microcomputer 111 and the camera microcomputer 205 communicate with each other via communication units 112 and 208 in synchronization with the control reference signal. The lens apparatus 100 obtains a power source from the camera body 200, and consumes it as a driving power source for a variety of actuators, a processing power source for the lens microcomputer 111 etc.

In this embodiment, the camera microcomputer 205 and the lens microcomputer 111 perform one packet communication having a fixed data length at timings in synchronization with a vertical control reference signal within one vertical synchronizing cycle.

Figure 5:
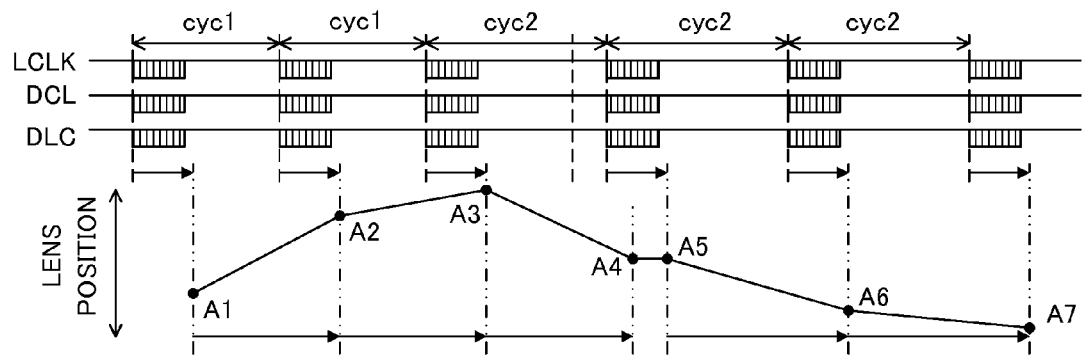
FIG. 5 illustrates an example of switching of the control reference signal illustrated in FIGS. 2 to 4 according to the first embodiment.
Figure 6:
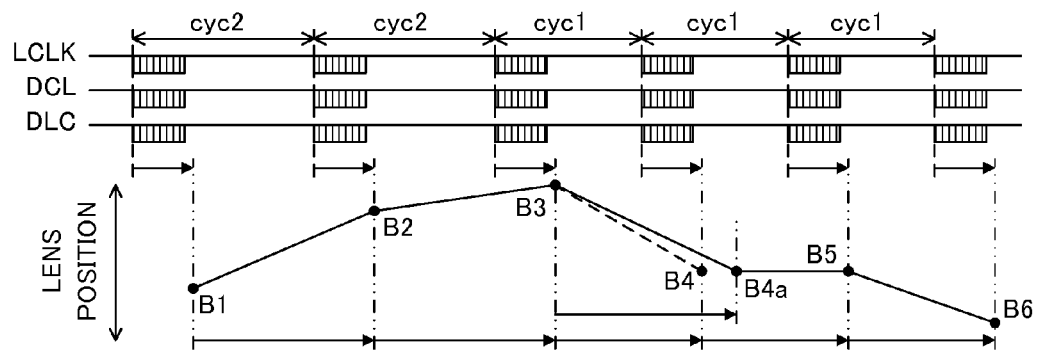
FIG. 6 illustrates an example of switching of the control reference signal illustrated in FIGS. 2 to 4 according to the first embodiment.
Figure 9:
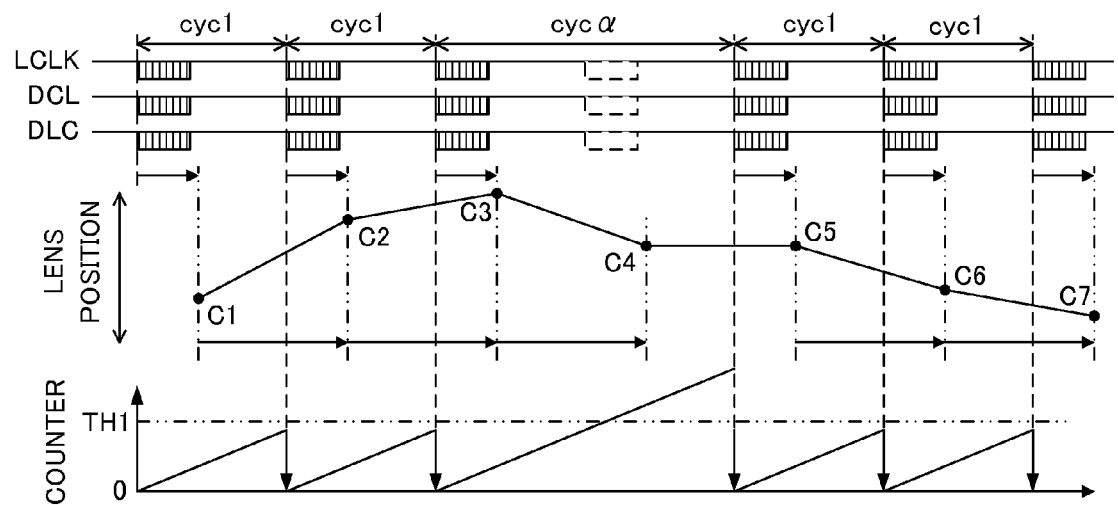
FIG. 9 illustrates an example of switching of the control reference signal of FIGS. 7 and 8 according to the second embodiment.

The communication method is a three-line type synchronizing serial communication method, and contains as illustrated in FIGS. 5, 6, and 9, a clock signal (control reference signal) LCLK, a data signal DCL from the camera body to the lens apparatus, and a data signal DLC from the lens apparatus to the camera body.

The clock signal LCLK is a clock master output from the camera body 200, and a burst method is used in which once the transmission starts, the clocks are continuously sent until a transmission of a predetermined standard data number is completed. In addition, a full duplex method is used in which the data signals DCL and DLC are mutually and simultaneously transmitted and received for the same clock.

The camera body 200 and the lens apparatus 100 check errors of the received data once they finish receiving the standard data number. The data check items contain checking whether the data number, a header code, and a check some code are correct values in the received data. The data that is verified as normal data by the error check is treated as control data, and the received data is destroyed when an error is found so as to avoid erroneous operations caused by erroneous control.

The camera body 200 and the lens apparatus 100 can send a transmission error message to the transmitter. For example, when the lens apparatus 100 detects an error, an error can be sent by fixing the data signal DLC (data lens to camera) onto an error notifying level for a predefined period at a predetermined timing. Similarly, an error can be sent when the camera body 200 detects an error, by fixing the data signal DCL (data camera to lens) onto the error notifying level for a predefined period at a predetermined timing. Thereby, both the camera body 200 and the lens apparatus 100 can recognize any errors, and they can return to a normal communication state in the subsequent recovery communication.

There are a still image pickup mode and a motion image pickup mode in the image pickup mode of the camera body 200, and the communication timing differs according to the image pickup mode.

The still image pickup mode requires an adaptable lens operation, and executes a necessary communication according to a manipulation of a photographer for each manipulation rather than a communication generated at timings of a specific cycle. For example, a shutter is closed in order to take an image as soon as an image pickup button is pressed, by a control communication to the lens apparatus 100, such as a focus lens control by autofocus ("AF") and a diaphragm control by auto-exposure ("AE") processing.

On the other hand, a motion image pickup mode requires a smooth lens control to the image pickup cycle and it is necessary to synchronize the image pickup timing of the camera body 200 with the control timing of the lens apparatus 100. More specifically, the control is synchronized with the image pickup cycle when the camera body 200 starts transmitting the clock signal LCLK in synchronization with the image pickup cycle in the camera and the lens apparatus 100 starts receiving the clock signal LCLK in synchronization with the reference timing of the lens control.

The image pickup cycle in the motion image pickup mode is not frequency changed so that a constant image pickup cycle can continue by previously determining the motion image pickup format using a camera menu.

The camera body 200 superimposes information of the cycle of the control reference signal on communication data, and sends it to the lens apparatus 100 with the control command. When the communication starts, the lens apparatus 100 sets this timing to the reference time and provides processing on the assumption that the communication cycle information informed by the previous communication continues.

A description will now be given of a case where the camera body 200 changes the cycle of the control reference signal.

First Embodiment

Referring now to FIGS. 1 to 6, a description will be given of a first embodiment of the preset invention.

The camera microcomputer 205 immediately changes the cycle of the control reference signal for the internal processing of the image pickup apparatus without inquiring the lens microcomputer 111 of whether the lens microcomputer 111 can follow a change of the cycle of the control reference signal. The camera microcomputer 205 sends a command of changing the cycle of the control reference signal to the lens microcomputer 111 in synchronization with the post-change control reference signal.

As a result, this embodiment can quickly change the cycle of the control reference signal. Moreover, this embodiment can maintain the responsiveness and operability when the cycle of the control reference signal is changed based upon the operation of the photographer (user). These operations may contain, for example, changing setting on the menu screen, detaching the lens apparatus 100, and setting at least one of the camera body 200 and the lens apparatus to a low consumption power state. As well as the detachment of the lens apparatus, an advance notice operation prior to the actual detachment of the lens apparatus may be used, such as a preparation of the detachment by pressing a button.

When the lens microcomputer 111 can immediately follow the new control reference signal, the lens microcomputer 111 sends the data signal DLC to the camera microcomputer 205, which contains the lens status information in response to the control command and a successful completion of the control.

On the other hand, when the lens microcomputer 111 cannot immediately adopt the new control reference signal, it is necessary to avoid losing control. According to this embodiment, the lens microcomputer 111 sends to the camera microcomputer 205 the data signal DLC that contains a failure of following the new cycle (by continuing processing with the previous control reference signal). In other words, when the lens microcomputer 111 receives the cycle changing command, it follows the command after it is ready to follow the change of the cycle of the control reference signal.

Thus, the camera microcomputer 205 does not immediately compel the lens microcomputer 111 to change to the new cycle, and can avoid losing control of the lens microcomputer 111. In addition, since the lens microcomputer 111 sends to the camera microcomputer 205 information of whether the lens microcomputer 111 has successfully changed the cycle of the control reference signal as instructed, the camera body 200 can take a proper measure in response to this communication.

Figure 2:
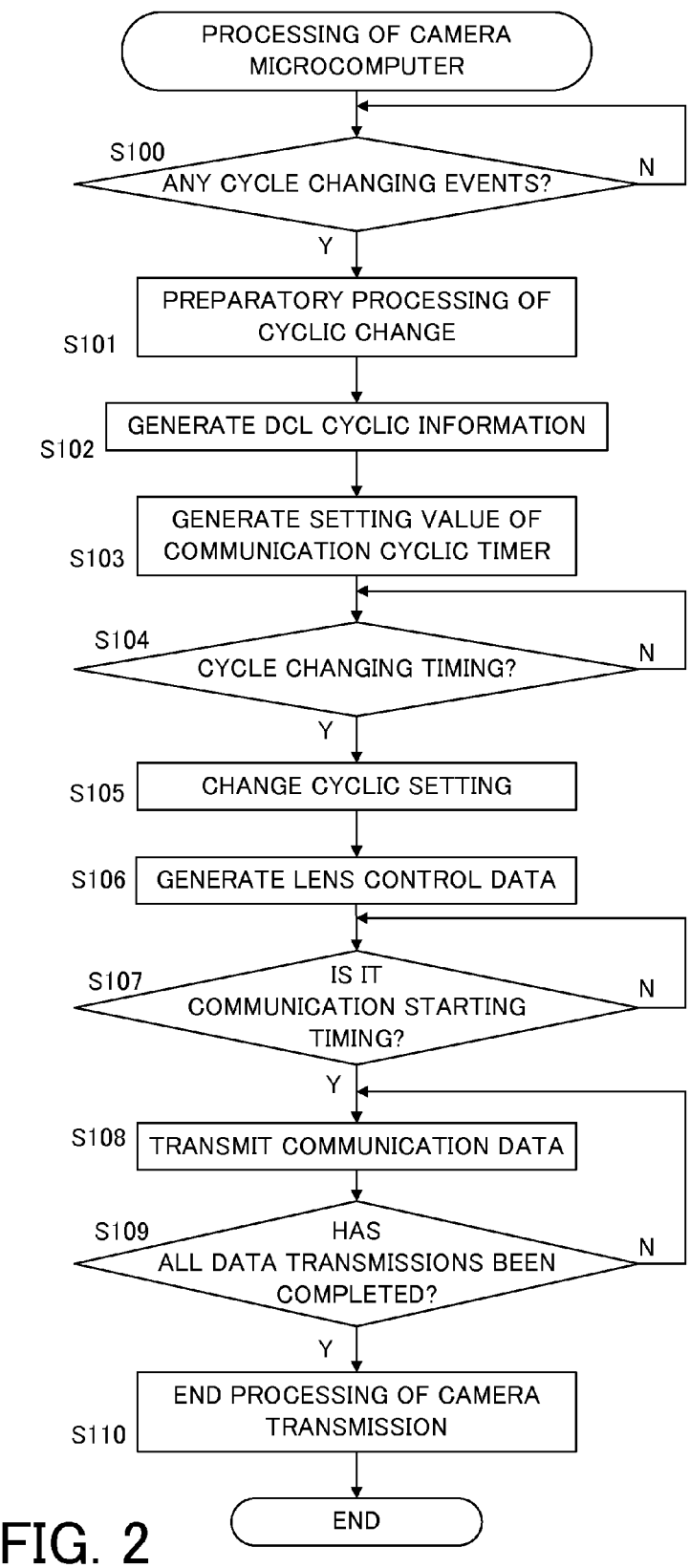
FIG. 2 is a flowchart for explaining switching processing of a control reference signal by a camera microcomputer illustrated in FIG. 1 according to the first embodiment.
Figure 3:
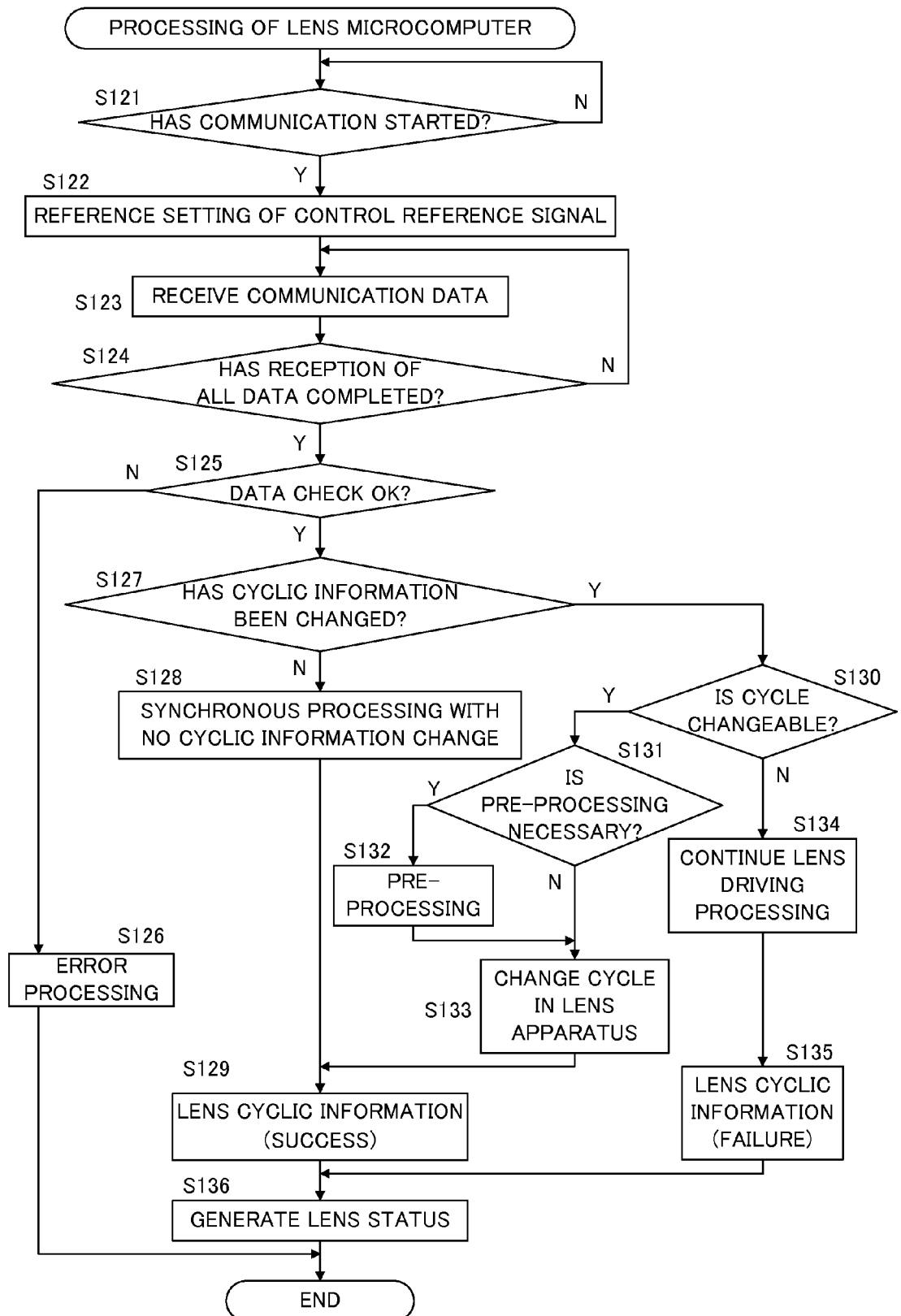
FIG. 3 is a flowchart for explaining communication processing of a lens microcomputer which responds to the processing illustrated in FIG. 2 according to the first embodiment.
Figure 4:
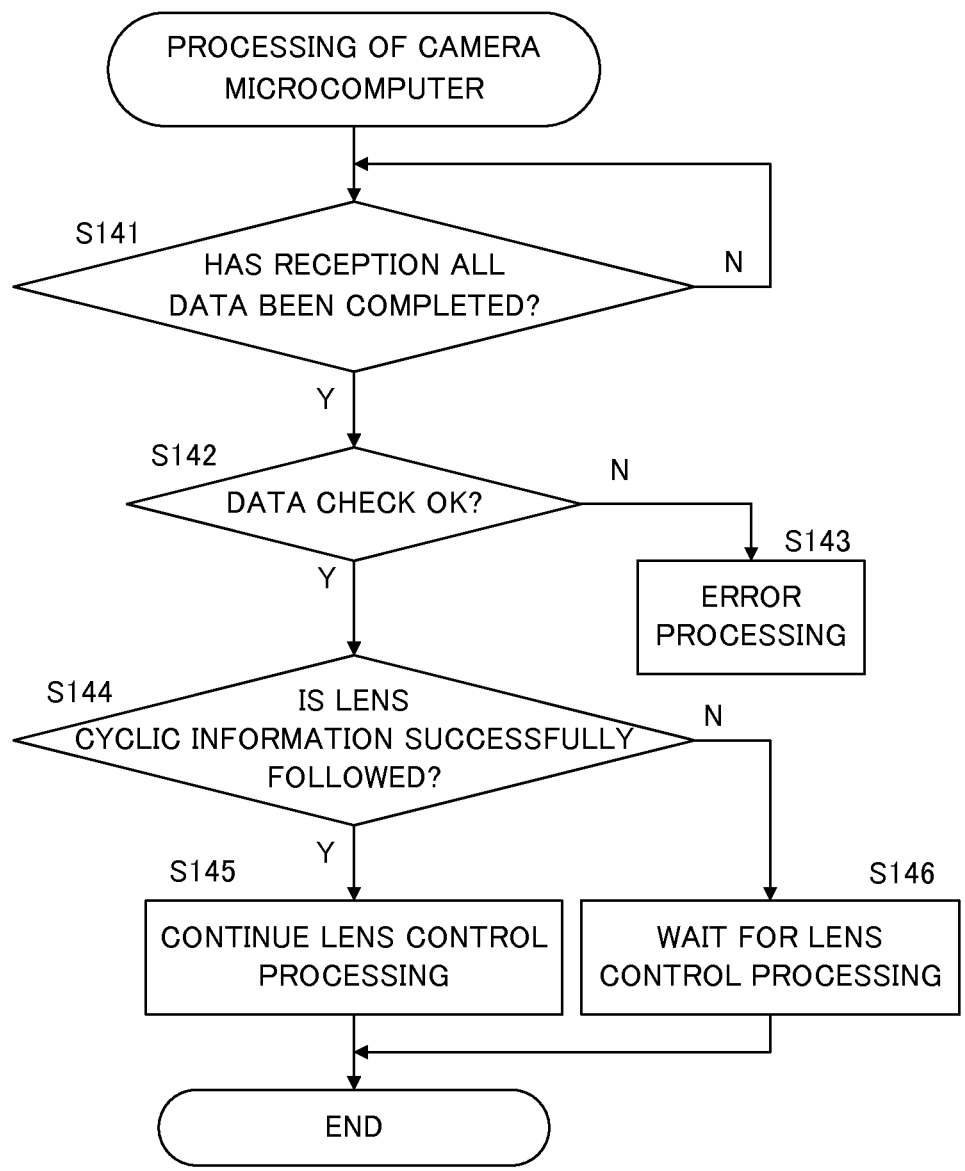
FIG. 4 is a flowchart for explaining communication processing of the camera microcomputer which responds to the processing illustrated in FIG. 3 according to the first embodiment.

Referring now to FIGS. 2 to 6, a description will be given of details of the above procedure containing an illustrative proper measure. FIGS. 2 and 4 are flowcharts of processing of the camera microcomputer 205 in changing the cycle of the control reference signal. FIG. 3 is a flowchart of processing of the lens microcomputer 111. In these figures, "S" stands for the "step," "Y" means "Yes," and "N" means "No." This is true of other similar figures.

The camera microcomputer 205 determines whether an event has occurred, such as an image pickup format changing instruction by a photographer, which changes the cycle of the control reference signal (S100). The camera microcomputer 205 waits for a cycle changing event (N of S100).

When the cycle changing event occurs (Y of S100), preparatory processing follows so as to switch the control cycle in the camera to the post-change cycle (S101). This preparatory processing can be generating processing of cycle setting information to a timing generator configured to control reading of stored image data from the image sensor and cyclic information for AE and AF processors in the camera. This embodiment immediately performs internal processing for changing the cycle of the control reference signal without an advance inquiry to the lens microcomputer 111 as to whether the lens microcomputer 111 can follow a change of the cycle of the control reference signal. Thus, this embodiment can quickly change the cycle of the control reference signal, and maintain the responsiveness and operability in changing the image pickup format.

Next, the camera microcomputer 205 generates new cyclic information (S102), and changes a setting value of a communication cycle timer configured to administrate a transmission start timing of the control communication to a new cycle (S103). The control communication needs to be made at regular cyclic intervals, and this cycle is strictly controlled by the hardware timer.

Next, the camera microcomputer 205 determines whether it is time to simultaneously reflect the setting information for the new cycle on each device and software processor relating to the change of the control cycle (S104), and stands by until the reflecting time comes (N of S104). The setting information is changed at the transmission starting timing of the control communication so as to avoid an erroneous cycle different from the cycle provided to the lens by the communication cycle information. When the reflecting time comes (Y of S104), the cycle of the control reference signal (which is expressed as "cyc" in FIGS. 5, 6 and 9) is reflected on each device and software processor and the setting information for the new cycle previously generated by S101 to S103 is simultaneously reflected (S105). By S105, the cyclic control in the camera is transferred to the new post-change cycle, and a variety of cyclic controls start.

Next, the camera microcomputer 205 generates lens control communication data (S106), and waits for the transmission start of the control communication to the lens microcomputer 111 under timing control of the new cycle (N of S107). At the transmission start timing for the next control communication (Y of S107), the camera microcomputer 205 transmits control communication data to the lens microcomputer 111 (S108). Due to the burst method, once the transmission starts, clocks are continuously sent until a transmission of the predetermined data number is completed. The camera microcomputer 205 determines whether the transmission of the predetermined data number is completed (S109). When the transmitted data number does not reach the predetermined data number (N of S109), the procedure returns to S108 and next control communication data is transmitted. The camera microcomputer 205 executes end processing of the control communication when all data is sent (S110).

FIG. 3 illustrates an operation of the lens microcomputer 111 configured to communicate with the camera microcomputer 205 that executes the flow illustrated in FIG. 2. Initially, the lens microcomputer 111 determines whether the control communication has started (S121), and stands by until the control communication starts (N of S121). The state of the communication signal is monitored so as to detect the timing at which the control communication from the camera microcomputer 205 starts. A signal line to be monitored is a signal line of the communication clock LCLK, and the changing timing of the logic level from the low level to the high level is detected. The lens microcomputer 111 determines that the communication has started when this monitoring condition is established (Y of S121), and sets the reference timing of the control reference signal at the timing at which the control communication has started (S122). Thereafter, the lens microcomputer 111 performs synchronous processing with the camera microcomputer 205 based upon this reference timing. There are two types of controls in the processing in the lens apparatus, i.e., synchronous processing synchronized with the control reference signal and asynchronous processing that does not depend upon the control reference signal.

Next, the lens microcomputer 111 receives the control data from the camera body 200 (S123). 1 byte data is generated and stored in a received data memory in the lens microcomputer 111 every eight communication clocks LCLK.

Next, the lens microcomputer 111 determines whether the received data number reaches the predetermined communication data number whenever it receives 1 byte data so as to detect the communication completion timing of the fixed byte length (S124). When the received data number has not yet reached the predetermined data number (N of S124), the flow returns to S123 and the lens microcomputer 111 receives next control communication data. When the received data number has reached the predetermined data number (Y of S124), the lens microcomputer 111 checks any errors in the received communication data so as to prevent malfunctions caused by the communication error (S125). The error check items contain the received byte number, the communication cycle time, header information, and check some information.

When the error is detected (N of S125), the lens microcomputer 111 performs error processing in accordance with a type of the error (S126). Thereby, the malfunction of the lens control can be avoided. In addition, predefined error message processing is performed so as to notify the camera microcomputer 205 that the data error has been detected in the lens apparatus 100.

When no error is detected (Y of S125), the lens microcomputer 111 determines whether the cycle of the control reference signal has been changed (S127). When the cycle has not been changed (N of S127), the lens microcomputer 111 maintains the current cycle of the control reference signal and performs synchronous processing (S128).

Next, the lens microcomputer 111 sends the "lens cyclic information" of the data signal DLC as "success" (S129). The "lens cyclic information" is information representing conformity between the cyclic information designated by the camera microcomputer 205 and the control cycle of the lens microcomputer 111.

On the other hand, when the lens microcomputer 111 receives from the camera microcomputer 205 a command of changing to a new cycle in S108 (Y of S127), the lens microcomputer 111 determines whether or not the lens microcomputer 111 can immediately follow the cycle changing command from the camera microcomputer 205 (S130).

Referring now to FIGS. 5 and 6, a description will be given of the change of the cyclic information in the control of the focus lens 104. In FIG. 5, the pre-change cycle of the clock signal LCLK as the control reference signal is cyc1 and its post-change cycle is cyc2. In FIG. 6, the pre-change cycle of the clock signal LCLK is cyc2 and the post-change cycle of the clock signal LCLK is cyc1. "cyc" stands for a cycle, and cyc1 is shorter than cyc2. In other words, FIG. 5 is a timing chart when the cycle of the control reference signal is changed to a longer cycle, and FIG. 6 is a timing chart when the cycle of the control reference signal is changed to a shorter cycle. In FIGS. 5 and 6, the "lens position" indicates a position of the focus lens 104.

In the motion image pickup, the lens microcomputer 111 calculates a moving speed based upon a current position, a target position, and the cycle of the control reference signal, and smoothly moves the focus lens 104 in accordance with this moving speed. In FIG. 5, for example, the current position is A1, the target position is A2, and the cycle of the control reference signal is cyc1. The lens microcomputer 111 drives the focus lens 104 from A1 to A2 as illustrated by an alternate long and two short dashes line a predetermined time after the lens microcomputer 111 receives the data signal DCL. A time period necessary for the focus lens 104 to move from A1 to A2 (corresponding to a length of a bottom line) is cyc1. In other words, a moving speed between A1 and A2 is calculated by dividing a distance between A1 and A2 by a cycle.

In FIG. 5, while the lens microcomputer 111 is moving the focus lens 104 from A2 to A3, the cycle is changed from cyc1 to cyc2, and the lens microcomputer 111 receives the data signal DCL that contains a driving command to the target position A4. In this case, the lens microcomputer 111 utilizes cyc1 to calculate a moving speed for moving the focus lens 104 from A3 to A4. In other words, it is cyc1 for the focus lens 104 to move from A3 to A4. The focus lens 104 reaches A4 before the lens microcomputer 111 receives the data signal DCL of a next target position A6, and thus the lens microcomputer 111 determines that it can follow the cyclic change.

When the change is workable (Y of S130), the lens microcomputer 111 determines whether the pre-processing is necessary for the cyclic change (S131). When the pre-processing is necessary (Y of S131), the lens microcomputer 111 performs the pre-processing (S132) and then the lens microcomputer 111 changes the cycle in the lens apparatus (S133). When the pre-processing is unnecessary (N of S131), the lens microcomputer 111 immediately changes the cycle in the lens apparatus (S133). Then, the flow moves to S129. The illustrative pre-processing is stopping the lens if the lens is moving and the stopping control is available. In the predetermined time period from A4 to A5 in FIG. 5, the lens microcomputer 111 stops the focus lens 104 (the position of the focus lens 104 is the same between A4 and A5). It is cyc2 for the focus lens 104 to move from A5 to A6 and to move from A6 to a next target position A7. In general, the lens microcomputer 111 is likely to follow the change of the cycle of the control reference signal to a shorter cycle.

On the other hand, in FIG. 6, the cycle changes from cyc2 to cyc1 when the lens microcomputer 111 is moving the focus lens 104 from B2 to B3, and the lens microcomputer 111 receives the data signal DCL that contains a driving command to the target position B4. In this case, the lens microcomputer 111 utilizes cyc2 to calculate the moving speed for moving the focus lens 104 from B3 to B4. Without the cyclic change, the focus lens 104 reached B4 as B4a (where the focus lens position is the same between B4 and B4a). However, the focus lens 104 reaches B4a after the lens microcomputer 111 receives the data signal DCL to the next target position B6, the lens microcomputer 111 determines that it cannot follow the cyclic change.

When the lens microcomputer 111 determines that the lens microcomputer 111 cannot immediately follow the cycle changing command from the camera microcomputer 205 (N of S130), the lens microcomputer 111 continues the processing, such as driving the lens, in accordance with the current cycle (S134). In other words, a movement from B3 to B4a continues. At the same time, the lens microcomputer 111 informs each processor of the cycle changing command so as to start the cyclic switching sequence. Thereafter, the lens microcomputer 111 sends the "lens cyclic information" of the data signal DLC as "failure" (S135).

After S129 or S135, the lens microcomputer 111 executes a variety of controls in accordance with the control command sent from the camera microcomputer 205, and generates the resultant lens status as lens status information (S136). The lens microcomputer 111 transmits the data signal DLC to the camera microcomputer 205 at a timing of the next control reference signal at which the camera microcomputer 205 starts the transmission.

FIG. 4 illustrates an operation of the camera microcomputer 205 that has received the data signal DLC from the lens microcomputer 111. S141 to S143 are error check and error processing of the communication data similar to S124 to S126.

In S144, the control command bifurcates depending upon "success" (S129) or "failure" (S135) in the "lens cyclic information." In case of "success" (Y of S144), the lens control processing continues (S145) and in case of "failure" (N of S144), the lens control processing stands by (discontinues) (S146). In general, the lens microcomputer 111 is less likely to follow the change of the cycle of the control reference signal to a shorter cycle.

In S145, as illustrated in FIG. 5, both the lens apparatus 100 and the camera body 200 are synchronized with the new cycle of the control reference signal, and the camera microcomputer 205 can control the lens apparatus 100 based upon the new cycle.

In S146, the lens apparatus 100 is not synchronized with the camera body 200, and thus the camera microcomputer 205 does not issue a control command for synchronous processing that relies upon the control reference signal (or in which the cycle is influential). In FIG. 6, a command of moving to B6 was originally issued at B4 from the data signal DCL but the focus lens 104 does not reach B4 at this time and thus this command is unworkable. If the camera microcomputer 205 sends a driving command to the next target position from B6 in the next communication at the position B4a, the control would be lost. Accordingly, in response to "failure," the camera microcomputer 205 of this embodiment includes a command of again moving to B6 in the next communication. In other words, the camera microcomputer 205 when receiving failure information makes the lens microcomputer 111 repeat driving of the focus lens 104 corresponding to the failure. Thereby, the lens microcomputer 111 makes the focus lens 104 stand by between B4a and B5 (where the lens position is the same among B4, B4a and B5) preventing the control from being lost.

Due to the above control flow, when it is necessary to switch the image pickup cycle, the camera microcomputer 205 informs the lens microcomputer 111 of the change of the cycle of the control reference signal and communicates with the lens microcomputer 111 using the post-change cycle. The lens microcomputer 111 receives a cycle changing command, switches the cycle of the control reference signal in the lens apparatus when it is ready to change the cycle, and informs the camera microcomputer 205 of success/failure information in response to the cycle changing command. The camera microcomputer 205 continues processing when the success/failure information is success, and waits for the synchronous processing in case of failure (although it may continue asynchronous processing that does not use the control reference signal or in which the cycle is not influential).

Second Embodiment

Figure 7:
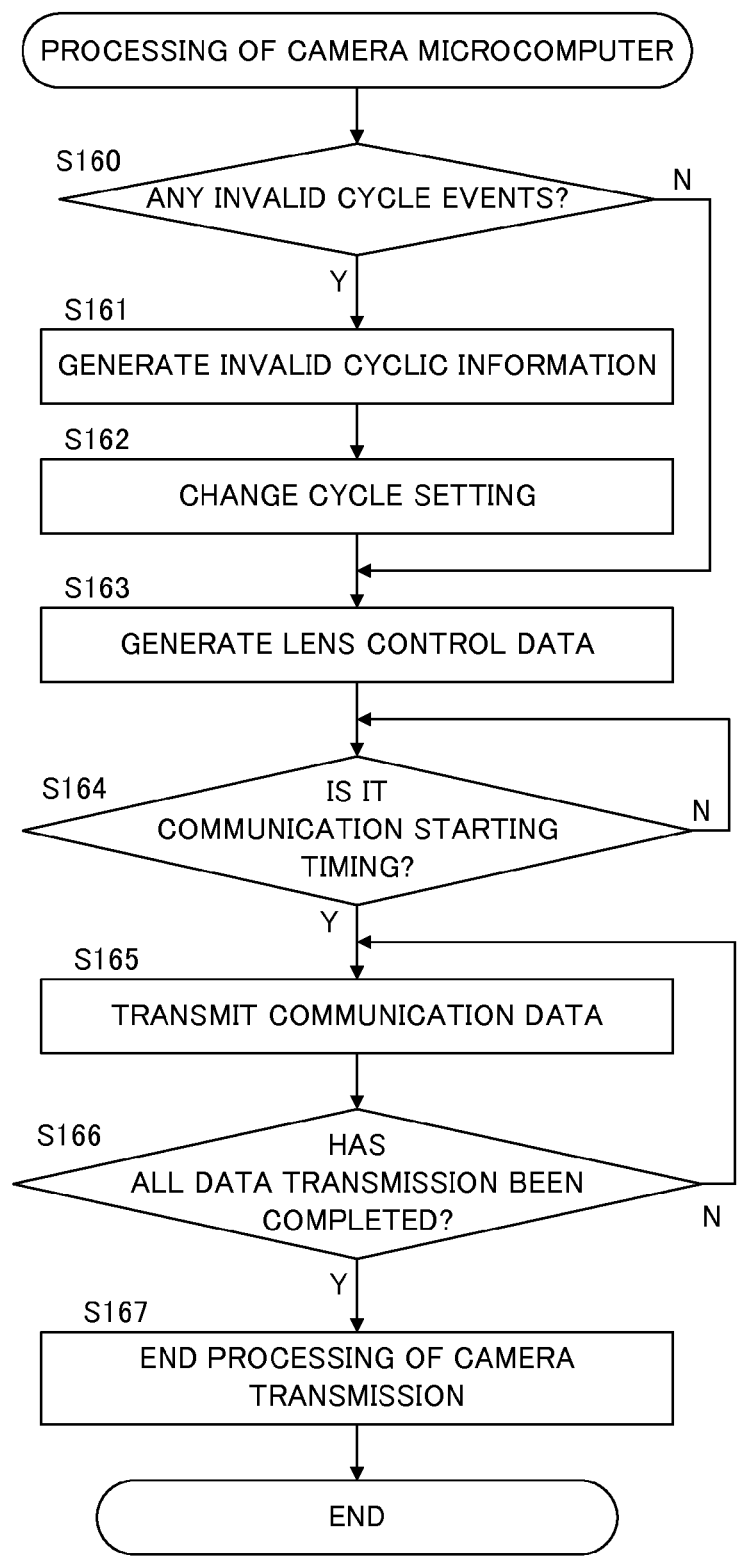
FIG. 7 is a flowchart for explaining communication processing of the camera microcomputer illustrated in FIG. 1 according to the second embodiment.
Figure 8:
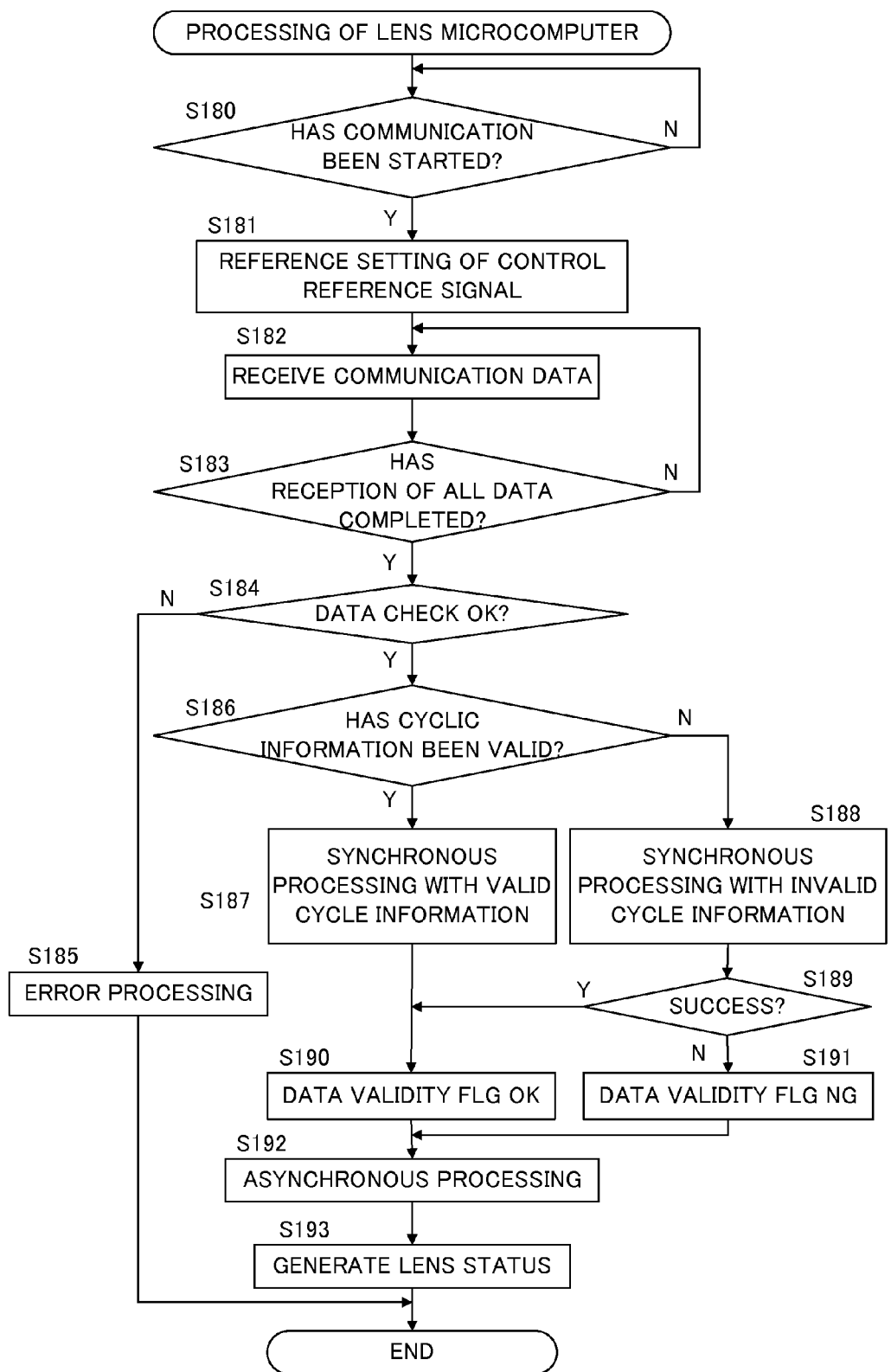
FIG. 8 is a flowchart for explaining processing of the lens microcomputer that responds to the processing illustrated in FIG. 7 according to the second embodiment.

Referring now to FIGS. 1 and 7-9, a description will be given of a second embodiment according to the present invention. Similar to the first embodiment, the structure of FIG. 1 is applied to this embodiment. FIG. 7 is a flowchart of communication processing of the camera microcomputer 205. FIG. 8 is a flowchart of processing of the lens microcomputer 111 in that case. FIG. 9 is a timing chart when it is informed in control of the focus lens that the cyclic information is invalid. The "lens position" is a position of the focus lens 104, and cyc1 and cycα are cycles of the clock signal LCLK as the control reference signal.

It is premise that the camera microcomputer 205 controls the lens microcomputer 111 in accordance with the cyclic timing designated by the communication cycle information. A communication with a cyclic timing different from the communication cyclic information may cause the lens control to be lost. Nevertheless, the camera microcomputer 205 actually performs other camera internal processing and may not maintain the communication cycle when another processing task having a high priority interferes with the processing timing. Thus, the camera microcomputer 205 needs to temporarily change the cycle of the control reference signal for internal processing of the image pickup apparatus. For example, each of the menu operation, shutter operation, AF, consecutive capturing, changing a frame rate of an image taken by the image sensor 201, etc. has a high priority because the responsiveness to the operation of the photographer is important.

According to this camera system, when the camera microcomputer 205 cannot maintain the cycle of the control reference signal, the camera microcomputer 205 informs the lens microcomputer 111 of the invalid cycle information. In this case, the camera microcomputer 205 temporarily changes the cycle of the control reference signal for internal processing of the image pickup apparatus and, similar to the first embodiment, the camera microcomputer 205 provides no advance inquiry to the lens microcomputer 111. In addition, different from the first embodiment, the microcomputer 205 does not provide a command of changing the cycle of the control reference signal to the lens microcomputer 111. The invalid cycle information is information representing that post-change cycle of the control reference signal is different from (does not accord with) the pre-change cycle of the control reference signal (which is a cycle informed by the communication cycle information). The camera microcomputer 205 sends the invalid cycle information to the lens microcomputer 111 in synchronization with the post-change control reference signal.

Due to the invalid cycle information, the lens microcomputer 111 can prevent the lens control from being lost by switching the synchronous processing to the proper state. In addition, the lens microcomputer 111 informs the camera microcomputer 205 of status valid information representing that status information as a processing status of the lens apparatus 100 in response to the invalid cycle information. The camera microcomputer 205 recognizes the processing status of the lens microcomputer 111 based upon the status valid information, and issues a proper lens control command.

Referring to FIG. 7, the camera microcomputer 205 determines whether or not there is an invalid control cycle event (S160). For example, the control cycle changing event is mainly caused by menu operating, shutter processing, AF processing, consecutive capturing, etc.

More specifically, the camera microcomputer 205 determines whether or not the transmission of the next control communication can be started at a cyclic timing of the previously informed control reference signal (S160). When the invalid cycle event occurs (Y of S160), the camera microcomputer 205 generates the invalid cycle information which is to be included in the control communication data sent to the lens microcomputer 111 (S161). The invalid cycle information is information representing that the cycle of the control reference signal provided by the camera microcomputer 205 to the lens microcomputer 111 at the transmission timing of the control communication is different from the cycle informed by the cyclic information.

Next, the camera microcomputer 205 changes the cycle setting (S162). In S162, the camera microcomputer 205 provides changing processing so as to temporarily switch the cycle of the control reference signal in the camera. For example, the camera microcomputer 205 changes settings in the communication cycle timer, a cyclic setting value in a timing generator (not illustrated) configured to control readout of stored image data from the image sensor 201, a cyclic setting value for the AE and AF processors in the camera body 200.

The camera microcomputer 205 generates lens control data when there is no invalid cycle event (N of S160) or after S162 (S163). When there is no invalid cycle event (N of S160), the camera microcomputer 205 provides a control communication in accordance with the previously noticed cyclic timing of the control reference signal (after S163). In S163, the camera microprocessor 205 includes invalid cycle information in this communication when there is the invalid cycle event (Y of S160). S164 to S167 are similar to S107 to S110. The transmission start timing of S164 is generated by the cycle of the control reference signal which has been previously notified to the lens apparatus, and managed by the cyclic timer etc. in the camera microcomputer 205.

FIG. 8 illustrates an operation of the lens microcomputer 111 configured to communicate with the camera microcomputer 205 that performs the flow illustrated in FIG. 7. Procedures from S180 to S185 are similar to those of S121 to S126. In S184, the lens microcomputer 111 checks an error of the received data, and determines that the communication has been successfully completed when a normal value is obtained in the error check (Y of S184), and determines whether or not there is invalid cycle information. (S186). In other words, the lens microcomputer 111 determines whether the control reference signal provided at the communication timing sent from the camera microcomputer 205 correctly accords with the timing notified in the cyclic information.

When there is no invalid cycle information (Y of S186), the control of the camera microcomputer 205 is correctly synchronized with the control of the lens microcomputer 111 by the current control reference signal. In this case, among a variety of controls performed in the lens apparatus 100, the synchronous control that is performed in synchronization with the control reference signal is performed in the control with the valid cycle (S187). The synchronous control contains, for example, driving control of the focus lens 104.

On the other hand, with the invalid cycle information (N of S186), the control reference signal provided from the camera microcomputer 205 is different from the timing notified in the cyclic information, and thus it is an abnormal state in which the control of the camera microcomputer 205 is not synchronized with the control of the lens microcomputer 111. In this case, the lens microcomputer 111 switches the synchronous control in the lens to the control for the invalid cycle (S188).

For example, when a new driving command is provided with the invalid cycle information while the focus lens 104 is moved from C2 to C3 by the previous driving command from the camera microcomputer 205 in FIG. 9, the lens microcomputer 111 completes driving instructed with the previous cycle cyc1. In other words, the lens microcomputer 111 completes a movement from C3 to a target position C4 that has been provided with cycα. Usually, the lens microcomputer 111 receives the data signal DCL between C3 and C4, and obtains a command, such as a next target position or an end of driving. However, the invalid cycle information has previously been received, and thus the lens microcomputer 111 waits for the next control command (without transmitting an error signal) even when the lens microcomputer 111 does not receive the data signal DCL in this period (C4 is located at the same position as C5). In other words, when receiving the invalid cycle information, the lens microcomputer 111 operates so as to maintain the lens control in that period, and provides a viable operation with the pre-change cycle cyc1, and does not provide an unworkable operation (stands by).

If the lens is currently stopped and a command is issued to make the lens continuously stop, processing is performed with a new control command because there is no problem in the lens control.

In S189, the lens microcomputer 111 determines, based upon the result of the applied processing with the invalid cycle processed by S188, whether it has successfully followed the new control command and switches a notice to the camera microcomputer 205 in the subsequent post-processing. When the lens microcomputer 111 could successfully follow the control command (Y of S189), the flow moves to S190, and when the lens microcomputer 111 failed to follow the control command (N of S189), the flow moves to S191.

In S190, the lens microcomputer 111 includes a validity flag (lens data valid information) in the data signal DLC which represents that the lens microcomputer 111 successfully performed the processing in accordance with the control command from the camera microcomputer 205. In FIG. 9, since the lens could reach the target position C4, the synchronous processing is workable (Y of S189) and the validity flag is contained. In S191, the lens microcomputer 111 includes an invalidity flag (lens data valid information) in the data signal DLC which represents that the lens microcomputer 111 failed to perform the processing in accordance with the control command from the camera microcomputer 205. The "lens data valid information" is information contained in the data signal DLC, which represents whether the lens microcomputer 111 has successfully performed or failed to perform processing in accordance with the control command designated by the camera microcomputer 205.

After S190 or S191, the lens microcomputer 111 performs asynchronous processing (S192). Next, the lens microcomputer 111 generates the lens status information similar to S136 (S193), and sends it in the data signal DLC to the camera microcomputer 205 at a next timing of the control reference signal sent from the camera microcomputer 205.

The camera microcomputer 205 does not issue a new control command when the data validity flag is NG (S191). For example, when cycα is shorter than cyc1, similar to FIG. 6, the camera microcomputer 205 does not issue a driving command of moving the focus lens 104 to the next target position from B6 because the focus lens 104 is located at B4a in FIG. 6. In other words, when the camera microcomputer 205 receives information of failure from the lens microcomputer 111, the camera microcomputer 205 makes the lens microcomputer 111 repeat driving of the image pickup optical system corresponding to the failure.

According to this embodiment, the camera microcomputer 205 that cannot maintain the cycle of the control reference signal sends invalid cycle information to the lens microcomputer 111 and informs the lens microcomputer 111 that the cycle is invalid. In response, the lens microcomputer 111 switches the synchronous processing that depends upon the cyclic information and timing to proper processing and prevents the lens control from being lost. In addition, the lens microcomputer 111 informs the camera microcomputer 205 of the status valid information representing the processing status of the lens apparatus 100. The camera microcomputer 205 recognizes the processing status of the lens apparatus 100 based upon this information, and issues a proper lens control command. This embodiment can also quickly completes switching of the cycle of the control reference signal, maintains the lens control even when the camera microcomputer 205 cannot temporarily break the cycle of the control reference signal, and realizes safe and quick operability in response to the instructional operation by the photographer.

The communication system between the lens apparatus 100 and the camera body 200 is not limited to the three-line type synchronizing serial communication system, and another communication method may be used, such as a two-line type start-stop synchronizing communication, an LVDS communication (difference serial communication), an optical communication, and a radio communication.

A communication applied to the image pickup cycle on the camera side is not necessarily made in the motion image pickup mode, and may be made in a so-called live-view display that enables an object image in the still image pickup mode to be confirmed on the display unit 206, such as a liquid crystal screen, without using an optical viewfinder.

The lens microcomputer 111 may monitor the cycle of the control reference signal. The time is measured from the start timing of the control communication (counter value of the reference clock signal illustrated in FIG. 9), and the result is compared with a cyclic time period (threshold) notified in the cyclic information from the camera microcomputer 205. When the measured time period is different from the cycle of the cyclic information (for example, when the counter value exceeds the threshold TH1), the lens microcomputer 111 may switch synchronous control in the lens apparatus to proper processing so as to maintain lens control and may transmit to the camera body 200 information representing that the cycle of the control reference signal is different.

The lens microcomputer 111 does not have to monitor the cycle of the control reference signal in asynchronous processing or send an error signal to the camera microcomputer 205 when detecting a shift of the cycle of the control reference signal without invalid cycle information from the camera microcomputer 205. Alternatively, the lens microcomputer 111 may send received information of the cycle of the control reference signal to the camera microcomputer 205 when detecting a shift of the cycle of the control reference signal while the lens microcomputer 111 has not yet received the invalid cycle information.

The lens microcomputer 111 may perform asynchronous processing without performing synchronous processing when receiving the invalid cycle information. In this case, the lens microcomputer 111 may send an invalid value as information relating to the synchronous processing, to the camera microcomputer 205.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The embodiments of the present invention cover software (computer program) used to realize a function of each embodiment or a system used to supply the software to the image pickup apparatus or lens apparatus including a computer directly from a recording medium or through wire or radio transmissions so as to run the program.

This application claims the benefit of Japanese Patent Application No. 2012-113894, filed May 18, 2012 which is hereby incorporated by reference herein in its entirety.

What is claimed is:

1. An image pickup system comprising a lens apparatus, and an image pickup apparatus to which the lens apparatus is detachably attached,
   wherein the lens apparatus includes a lens controller, and an image pickup optical system configured to form an optical image of an object,
   wherein the image pickup apparatus includes an image pickup apparatus controller configured to communicate with the lens controller in synchronization with a control reference signal,
   wherein the lens controller controls driving of a driven unit included in the image pickup optical system in synchronization with the control reference signal provided from the image pickup apparatus controller,
   wherein the image pickup apparatus controller temporarily changes a cycle of the control reference signal, and sends invalid cycle information representing that a post-change cycle of the control reference signal does not accord with a pre-change cycle of the control reference signal, to the lens controller in synchronization with a post-change control reference signal, and wherein when receiving the invalid cycle information, the lens controller performs synchronous processing that is processing performed in synchronization with the control reference signal in a case the lens controller can perform the synchronous processing using a pre-change control reference signal, the lens controller stands by in a case the lens controller cannot perform the synchronous processing using the pre-change control reference signal, and the lens controller sends to the image pickup apparatus controller information representing whether or not the lens controller has been able to follow a changed cycle of the control reference signal.

2. The image pickup system according to claim 1, wherein when receiving information representing that the lens controller has failed, the image pickup apparatus controller makes the lens controller repeat driving the driven unit included in the image pickup optical system corresponding to a failure.

3. The image pickup system according to claim 1, wherein the lens controller monitors the cycle of the control reference signal based upon a start timing of a communication sent from the image pickup apparatus controller, and sends an error signal to the image pickup apparatus controller when detecting a shift of the cycle of the control reference signal without the invalid cycle information from the image pickup apparatus controller.

4. The image pickup system according to claim 1, wherein the lens controller monitors the cycle of the control reference signal based upon a start timing of a communication sent from the image pickup apparatus controller, and sends to the image pickup apparatus controller information of the cycle of the control reference signal which the lens controller has received when detecting a shift of the cycle of the control reference signal without the invalid cycle information from the image pickup apparatus controller.

5. The image pickup system according to claim 1, wherein the image pickup apparatus further includes an image sensor configured to photoelectrically convert the optical image formed by the image pickup optical system, and wherein the image pickup apparatus controller sends the invalid cycle information to the lens controller in response to an operation used to change a frame rate of an image taken by the image sensor.

6. The image pickup system according to claim 1, wherein the image pickup apparatus further includes a display unit configured to display a menu screen, and wherein the image pickup apparatus controller sends the invalid cycle information to the lens controller in response to an operation of the menu screen.

7. The image pickup system according to claim 1, wherein the image pickup apparatus sends the invalid cycle information to the lens controller when there is an operation to detach the lens apparatus from the image pickup apparatus or an advance notice operation of the operation to detach the lens apparatus from the image pickup apparatus.

8. The image pickup system according to claim 1, wherein the image pickup apparatus sends the invalid cycle information to the lens controller when there is an operation configured to set at least one of the image pickup apparatus and the lens apparatus to a low consumption power mode.

9. An image pickup system comprising a lens apparatus, and an image pickup apparatus to which the lens apparatus is detachably attached, wherein the lens apparatus includes a lens controller, and an image pickup optical system configured to form an optical image of an object, wherein the image pickup apparatus includes an image pickup apparatus controller configured to communicate with the lens controller in synchronization with a control reference signal, wherein the lens controller controls driving of a driven unit included in the image pickup optical system in synchronization with the control reference signal provided from the image pickup apparatus controller, wherein the image pickup apparatus controller temporarily changes a cycle of the control reference signal, and sends invalid cycle information representing that a post-change cycle of the control reference signal does not accord with a pre-change cycle of the control reference signal, to the lens controller in synchronization with a post-change control reference signal, and wherein when receiving the invalid cycle information, the lens controller does not perform synchronous processing that is processing performed in synchronization with the control reference signal, and performs asynchronous processing that does not depend upon the control reference signal.

10. The image pickup system according to claim 9, wherein the lens controller sends an invalid value as information relating to the synchronous processing to the image pickup apparatus controller.

11. The image pickup system according to claim 9, wherein the lens controller monitors the cycle of the control reference signal based upon a start timing of a communication sent from the image pickup apparatus controller, and does not monitor the cycle of the control reference signal for the asynchronous processing.

12. The image pickup system according to claim 9, wherein the lens controller monitors the cycle of the control reference signal based upon a start timing of a communication sent from the image pickup apparatus controller, and sends an error signal to the image pickup apparatus controller when detecting a shift of the cycle of the control reference signal without the invalid cycle information from the image pickup apparatus controller.

13. The image pickup system according to claim 9, wherein the lens controller monitors the cycle of the control reference signal based upon a start timing of a communication sent from the image pickup apparatus controller, and sends to the image pickup apparatus controller information of the cycle of the control reference signal which the lens controller has received when detecting a shift of the cycle of the control reference signal without the invalid cycle information from the image pickup apparatus controller.

14. The image pickup system according to claim 9, wherein the image pickup apparatus further includes an image sensor configured to photoelectrically convert the optical image formed by the image pickup optical system, and wherein the image pickup apparatus controller sends the invalid cycle information to the lens controller in response to an operation used to change a frame rate of an image taken by the image sensor.

15. The image pickup system according to claim 9, wherein the image pickup apparatus further includes a display unit configured to display a menu screen, and wherein the image pickup apparatus controller sends the invalid cycle information to the lens controller in response to an operation of the menu screen.

16. The image pickup system according to claim 9, wherein the image pickup apparatus sends the invalid cycle information to the lens controller when there is an operation to detach the lens apparatus from the image pickup apparatus or an advance notice operation of the operation to detach the lens apparatus from the image pickup apparatus.

17. The image pickup system according to claim 9, wherein the image pickup apparatus sends the invalid cycle information to the lens controller when there is an operation configured to set at least one of the image pickup apparatus and the lens apparatus to a low consumption power mode.

18. An image pickup apparatus to which a lens apparatus including a lens controller, and an image pickup optical system configured to form an optical image of an object is detachably attached, the image pickup apparatus comprising an image pickup apparatus controller configured to communicate with the lens controller in synchronization with a control reference signal,
wherein the image pickup apparatus controller provides the control reference signal to the lens controller, thereby the lens controller controlling driving of a driven unit included in the image pickup optical system in synchronization with the control reference signal, and
wherein the image pickup apparatus controller temporarily changes a cycle of the control reference signal, and sends invalid cycle information representing that a post-change cycle of the control reference signal does not accord with a pre-change cycle of the control reference signal, to the lens controller in synchronization with a post-change control reference signal.

19. The image pickup apparatus according to claim 18, wherein when receiving the invalid cycle information, the lens controller performs synchronous processing that is processing performed in synchronization with the control reference signal in a case the lens controller can perform the synchronous processing using a pre-change control reference signal, the lens controller stands by in a case the lens controller cannot perform the synchronous processing using the pre-change control reference signal, and the image pickup apparatus controller receives from the lens controller information representing whether or not the lens controller has been able to follow a changed cycle of the control reference signal.

20. A lens apparatus detachably attached to an image pickup apparatus that includes an image pickup apparatus controller configured to communicate with the lens apparatus in synchronization with a control reference signal, the lens apparatus comprising:
a lens controller configured to communicate with the image pickup apparatus controller in synchronization with the control reference signal and to receive the control reference signal from the image pickup apparatus controller; and
an image pickup optical system configured to form an optical image of an object,
wherein the lens controller controls driving of a driven unit included in the image pickup optical system in synchronization with the control reference signal, and
wherein when receiving invalid cycle information representing that a post-change cycle of the control reference signal does not accord with a pre-change cycle of the control reference signal in synchronization with a post-change control reference signal, the lens controller performs synchronous processing that is processing performed in synchronization with the control reference signal in a case the lens controller can perform the synchronous processing using a pre-change control reference signal, the lens controller stands by in a case the lens controller cannot perform the synchronous processing using the pre-change control reference signal, and the lens controller sends to the image pickup apparatus controller information representing whether or not the lens controller has been able to follow a changed cycle of the control reference signal.

21. A lens apparatus detachably attached to an image pickup apparatus controller configured to communicate with the lens apparatus in synchronization with a control reference signal, the lens apparatus comprising:
a lens controller configured to communicate with the image pickup apparatus controller in synchronization with the control reference signal and to receive the control reference signal from the image pickup apparatus controller; and
an image pickup optical system configured to form an optical image of an object,
wherein the lens controller controls driving of a driven unit included in the image pickup optical system in synchronization with the control reference signal, and
wherein when receiving invalid cycle information representing that a post-change cycle of the control reference signal does not accord with a pre-change cycle of the control reference signal in synchronization with a pre-change control reference signal, the lens controller does not perform synchronous processing that is processing performed in synchronization with the control reference signal, and performs asynchronous processing that does not depend upon the control reference signal.

* * * * *